US011667547B2

(12) United States Patent
Sinha (10) Patent No.: US 11,667,547 B2
(45) Date of Patent: Jun. 6, 2023

(54) HYBRID ACOUSTIC, CENTRIFUGAL OIL/WATER SEPARATION

(71) Applicant: AWE Technologies, LLC, Bay Shore, NY (US)

(72) Inventor: Dipen N. Sinha, Bay Shore, NY (US)

(73) Assignee: AWE Technologies, LLC, Bay Shore, NY (US)

( * ) Notice: Subject to any disclaimer, the term of this patent is extended or adjusted under 35 U.S.C. 154(b) by 33 days.

(21) Appl. No.: 17/376,707

(22) Filed: Jul. 15, 2021

(65) Prior Publication Data

US 2022/0017387 A1 Jan. 20, 2022

Related U.S. Application Data

(60) Provisional application No. 63/053,442, filed on Jul. 17, 2020.

(51) Int. Cl.
*C02F 1/38* (2023.01)
*C02F 1/40* (2023.01)
*C02F 1/36* (2023.01)
*C02F 101/32* (2006.01)

(52) U.S. Cl.
CPC ............... *C02F 1/385* (2013.01); *C02F 1/36* (2013.01); *C02F 1/40* (2013.01); *C02F 2101/32* (2013.01); *C02F 2301/026* (2013.01)

(58) Field of Classification Search
CPC ........ C01B 13/11; C12M 35/04; C12N 15/00; C12N 13/00; C02F 1/42; C02F 1/38; C02F 1/40; C02F 1/36; A61L 2/025
See application file for complete search history.

(56) References Cited

U.S. PATENT DOCUMENTS 5,562,823 A * 10/1996 Reeves ................. B04B 5/0421
210/243

FOREIGN PATENT DOCUMENTS

WO WO-2011067336 A1 * 6/2011 ............. B01D 45/16
WO WO-2017193085 A1 * 11/2017 ........... B01D 21/262

* cited by examiner

*Primary Examiner* — Walter D. Griffin
*Assistant Examiner* — Cameron J Allen
(74) *Attorney, Agent, or Firm* — Samuel M. Freund; Cochran Freund & Young LLC (57) ABSTRACT

Apparatus and method for separating oil from water in produced oil without requiring large separation tanks in which the fluid is heated, using a simple, energy efficient separation process, are described. Centrifugal forces, by themselves, are not effective for completely separating a two-component fluid, especially when the densities of the fluids are similar, such as for heavy oil. By combining both primary and secondary acoustic forces, and taking advantage of centrifugal forces from fluid flow, such that acoustic radiation forces initiate the process of droplet accumulation, and contribute to droplet coalescence, centrifugal separation is enhanced.

28 Claims, 7 Drawing Sheets

HYBRID ACOUSTIC, CENTRIFUGAL OIL/WATER SEPARATION

CROSS-REFERENCE TO RELATED APPLICATIONS

The present application claims the benefit of U.S. Provisional Patent Application No. 63/053,442 for "Hybrid Acoustic, Centripetal Oil/Water Separation" which was filed on 17 Jul. 2020, the entire content of which Patent Application is hereby specifically incorporated by reference herein for all that it discloses and teaches.

BACKGROUND

Although oil and gas are produced in almost every part of the world, from 100 barrel per day private wells, to large bore 4000 barrel per day wells, from 20 m deep reservoirs, to 3000 m deep wells, and from wells in greater than 2000 m of water, many portions of the production process are similar in principle. Naturally occurring hydrocarbons found in petroleum reservoirs are mixtures of organic compounds that exhibit multiphase behavior over a wide range of pressures and temperatures, and mixtures of oil, gas, and water produced from various wellheads are separated into individual components in separation facilities. Gas may be separated from the mixture in pressure reduction within storage containers, before the oil and water are separated, with the latter separation requiring a multi-stage thermodynamic separation process in pressure vessels at different pressures and temperatures, followed by gravitational separation of the oil and water into separate oil and water streams. For separation of water and oil, in particular, where the oil comprises heavy oil, the raw fluid is heated to change the density of the oil and water so that these fluids can separate.

An alternative for gas-liquid separation, which is economically attractive, is the Gas Liquid Cylindrical Cyclone (GLCC), which is a simple, compact, and low-cost separator having a vertical pipe section, with a downward inclined, tangential inlet located approximately at the middle. The separation in the GLCC is achieved by centrifugal and gravity effects. Many of the studies on liquid-liquid cyclonic separation have been focused on conical liquid hydrocyclones (LLHC).

SUMMARY

In accordance with the purposes of the present invention, as embodied and broadly described herein, an embodiment of the method for separating oil droplets from water in a mixture thereof, hereof, includes: flowing the mixture through a first length of pipe having a first exit orifice; generating first acoustic standing waves inside of the first length of pipe effective for producing acoustic radiation forces having first pressure nodes, such that the oil droplets concentrate and coalesce at the first pressure nodes, and wherein the acoustic waves have a first frequency; flowing the mixture having the concentrated and coalesced oil droplets passing through the first exit orifice through a second length of pipe having a second exit orifice, the second length of pipe being formed into a planar configuration having a radius of curvature and an axis, such that the coalesced oil droplets move to greater distances from the axis as a result of centrifugal forces; and separating the coalesced oil droplets from the water passing through the second exit orifice.

In another aspect of the present invention, and in accordance with its purposes, an embodiment of the method for separating oil droplets from water in a mixture thereof, hereof, includes: flowing the mixture through a first length of pipe having a first exit orifice; generating first acoustic standing waves inside of the first length of pipe effective for producing acoustic radiation forces having first pressure nodes, such that the oil droplets concentrate and coalesce at the first pressure nodes, and wherein the acoustic waves have a first frequency; flowing the mixture having the concentrated and coalesced oil droplets through a second length of pipe having a second exit orifice, the second length of pipe being formed into a planar configuration having a radius of curvature and an axis, such that the coalesced oil droplets move to greater distances from the axis as a result of centrifugal forces; and flowing the mixture having concentrated and coalesced oil droplets passing through the second exit orifice through a third length of pipe disposed vertically and having an upper exit orifice and a lower exit orifice, whereby the coalesced oil droplets separate from the water as a result of the buoyancy of the coalesced oil droplets and pass through the upper exit orifice of the third length of pipe, and the water passing through the lower exit orifice thereof.

In yet another aspect of the present invention, and in accordance with its purposes, an embodiment of the apparatus for separating oil droplets from water in a mixture thereof, hereof, includes: a first length of pipe through which the mixture is caused to flow, the first length of pipe having an outer surface, an inner volume, and a first exit orifice; at least one first acoustic transducer in acoustic contact with the outer surface of the first length of pipe, for generating first acoustic standing waves in the inner volume of the first length of pipe effective for producing acoustic radiation forces having first pressure nodes such that the oil droplets concentrate and coalesce at the first pressure nodes, and wherein the acoustic waves have a first frequency; a first waveform generator for powering the at least one first acoustic transducer; and a second length of pipe for receiving the concentrated and coalesced oil droplets flowing through the first exit orifice of the first length of pipe, having a second exit orifice, the second length of pipe being formed into a planar configuration having a radius of curvature and an axis, such that the coalesced oil droplets move to greater distances from the axis as a result of centrifugal forces.

In still another aspect of the present invention, and in accordance with its purposes, an embodiment of the apparatus for separating oil droplets from water in a mixture thereof, hereof, includes: a first length of pipe through which the mixture is caused to flow, the first length of pipe having an outer surface, an inner volume, and a first exit orifice; at least one first acoustic transducer in acoustic contact with the outer surface of the first length of pipe, for generating first acoustic standing waves in the inner volume of the first length of pipe effective for producing acoustic radiation forces having first pressure nodes such that the oil droplets concentrate and coalesce at the first pressure nodes, and wherein the acoustic waves have a first frequency; a first waveform generator for powering the at least one first acoustic transducer; a second length of pipe for receiving the concentrated and coalesced oil droplets flowing through the first exit orifice of the first length of pipe, having a second exit orifice, the second length of pipe being formed into a planar configuration having a radius of curvature and an axis, such that the coalesced oil droplets move to greater distances from the axis as a result of centrifugal forces; and a third length of pipe for receiving the concentrated and coalesced oil droplets flowing through the second exit orifice, disposed vertically and having an upper exit orifice and a lower exit orifice, whereby the concentrated and coalesced oil droplets separate from the water as a result of the buoyancy of the coalesced oil droplets and pass through the upper exit orifice of the third length of pipe, and the water passes through the lower exit orifice thereof.

Benefits and advantages of the present invention include, but are not limited to, providing an apparatus and method for separating oil from water in an emulsion thereof, without the need for large, heated separation tanks as currently used, thereby reducing maintenance and improving energy efficiency.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a side perspective view of an embodiment of an apparatus for bulk separation of oil from water, illustrating horizontal standing wave nodal planes generated in a vertical cylinder by an acoustic transducer disposed on the bottom thereof, such that oil droplets in an oil/water emulsion concentrate and coalesce at these planes, while

FIGS. 2A-2C illustrate the directions of the forces on the oil droplets in the apparatus of FIGS. 1A and 1B hereof, FIG. 2A showing the standing wave nodal planes that are parallel circular surfaces horizontal in orientation, with acoustic radiation forces (ARF) being directed toward these nodal planes from both sides, and the gravitational buoyancy force shown operating only in the upward vertical direction, while

FIG. 6A is a schematic representation of a cross section of the pipe illustrated in FIG. 5 hereof, and shows the major forces acting on an oil droplet in water inside the circular pipe section, and a general oil collection region resulting therefrom, whereas

DETAILED DESCRIPTION

Water found in oil wells is common, and burdensome to operators. Current water/oil separation processes are slow, environmentally unfriendly, and consume a large amount of energy for heating. On offshore and floating drilling platforms, space is limited and separation equipment having small size and weight, and lower energy consumption is desirable. Heating the oil and water mixture in pressure vessels and employing gravity for separation of the components, along with series separation systems (pressure vessels and separation tanks) being needed to achieve the desired quality of separation, requires significant space. For offshore platforms, weight is also an important concern.

A simple, inexpensive apparatus having a small footprint, capable of seabed and offshore floating platform operation, and which can separate oil from water in real-time without using large settling tanks, can save the industry a considerable amount of money for operating and maintenance costs, in addition to saving space and eliminating many environmental concerns.

Briefly, embodiments of the present invention include an apparatus and method for separating oil from water in produced oil/water mixtures without requiring large tanks in which the fluid is heated, and without relying on gravitational force for separation of the components. Rather, embodiments of the present invention use a simple, energy efficient separation process that employs acoustic radiation forces that behave as an acoustic gravitational force, but with several differences. The mixture is caused to flow through a length of pipe in which acoustic standing waves effective for producing acoustic radiation forces having pressure nodes where oil droplets concentrate and coalesce are generated, after which the mixture is caused to flow through a length of pipe having a planar circular configuration having an axis, such that the coalesced oil droplets move to greater distances from the pipe axis as a result of centrifugal forces, wherein the coalesced oil droplets can be more readily separated from the water.

An acoustic radiation force is the time-averaged force acting on an object in a sound field, where the object in the wave path absorbs or reflects sound energy. Although acoustic separation of solids (particles) from fluids, and liquid-liquid separation are well-known and used for small-scale separation processes, microfluidics being a significant area of application, this technology has not been used for large-scale separations, such as in the energy industry. This is because acoustic forces alone cannot readily be scaled to larger dimensions for rapidly separating fluid mixtures with low-energy consumption. Acoustic separation processes become inefficient at large dimensions, because of the power required to excite large ultrasonic transducers. Additionally, at high acoustic power, acoustic streaming becomes dominant, which diminishes the separation.

Further, centrifugal, Coriolis and gravitational/buoyant forces by themselves are not effective for completely separating a two-component fluid, especially when the densities of the fluids are similar, such as for heavy oil and water. However, by combining acoustic forces, both primary and secondary, and taking advantage of fluid flow, a synergistic effect is generated, where most of the energy of separation comes from the kinetic energy of the flowing fluid itself, while the fluid hydrodynamics, nucleation, and medium nonlinearity combine to significantly improve the energy efficiency of the separation process. Therefore, it is possible to use sections of pipe in place of large separation vessels to carry out the separation process. The acoustic radiation forces initiate the mixture separation process and contribute to fluid droplet coalescence that further enhances the separation initiation. The centrifugal force from the flowing liquid in a pipe having a curved geometry then completes the separation process of the fluid mixture (both fluid emulsions (oil-water-gas) and suspensions (particle-fluid)) without requiring a large acoustic energy input. It is expected that embodiments of the present invention will be effective for subsea operations where it is desired that the water is separated from the oil before pumping the oil to the surface from the seabed. Another significant area of use is floating oil platforms.

A. Acoustic Radiation Force:

All forms of wave motion, including electromagnetic waves, transverse waves on an elastic string, surface waves on a liquid, and longitudinal sound waves, exert unidirectional radiation forces on absorbing and reflecting obstacles in their path. Similarly, acoustic radiation force, is a physical phenomenon resulting from the interaction of an acoustic wave with an obstacle disposed in its path, and may be interpreted as the time-averaged force acting on an object in a sound field. The magnitude of the force depends on object size, density and compressibility, and on the nature of the host medium, such as compressibility, density, and sound speed. The effect of host medium viscosity is typically very small. The following equations illustrate the dependence of the force on the various parameters.

$$F_{ac} = \left[\frac{P_0^2 V_p \beta_m}{2\lambda_m}\right] \varphi(\beta, \rho) \sin\left(\frac{4\pi z}{\lambda_m}\right), \text{ where} \quad \text{Eq. (1)}$$

$$\varphi(\beta, \rho) = \left(\frac{5\rho_p - 2\rho_m}{2\rho_p + \rho_m} - \frac{\beta_p}{\beta_m}\right), \text{ and} \quad \text{Eq. (2)}$$

$V_o$=volume of droplet (particle), $\beta$=compressibility, $\rho$=density, $\lambda$=wavelength of sound $P_O$=Peak acoustic pressure, z=distance from pressure node, and m, p=host and droplet (subscripts), respectively.

Equation 2 defines the acoustic contrast factor. The sign of this factor determines which direction an object will be pushed if the object is placed in a resonant sound field inside a cavity. This means that if the frequency of the sound wave is adjusted such that standing waves are set up in the cavity due to reflections from the side opposite the acoustic source, small objects will rapidly collect at the pressure nodes. Collection time depends on the residence time, and the acoustic frequency, and power. Moreover, when fluid droplets or particles get close to each other, the attractive Bjerknes force becomes strong, which causes the pattern to become more compact and the droplets to coalesce.

Figure 1A:
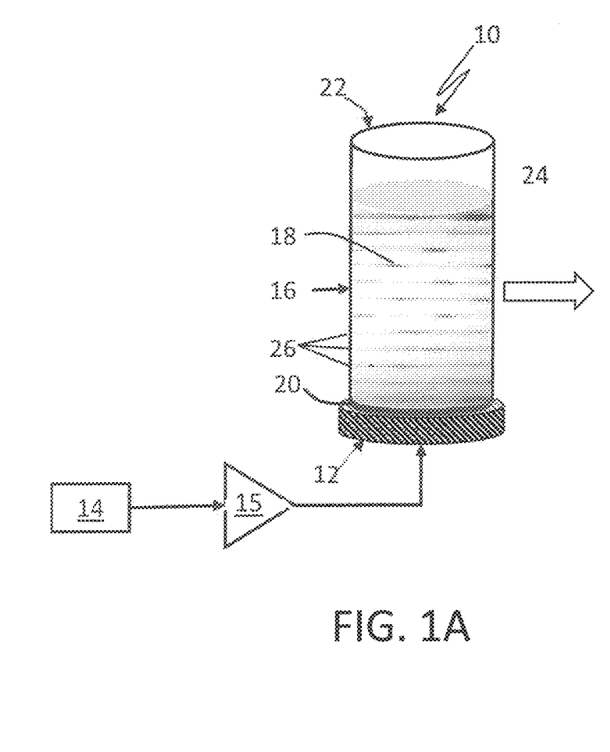
Figure 1B:
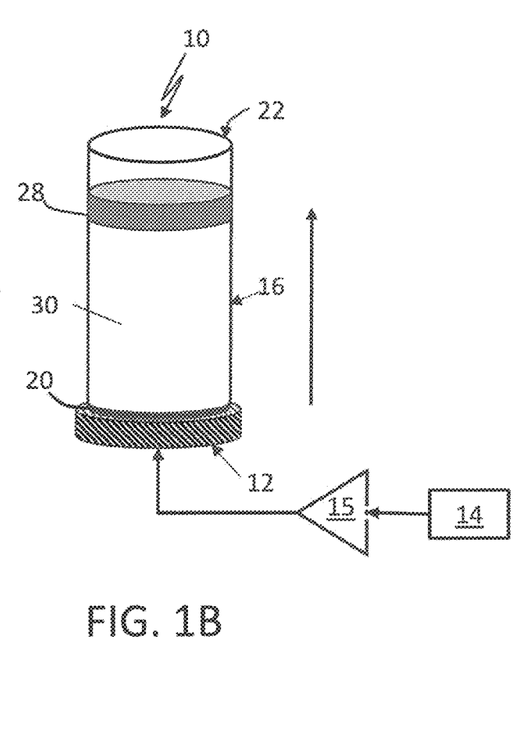
FIG. 1B shows the eventual formation of an oil layer on the surface of the water due to the increasing buoyancy of the coalesced droplets.
Figure 2A:
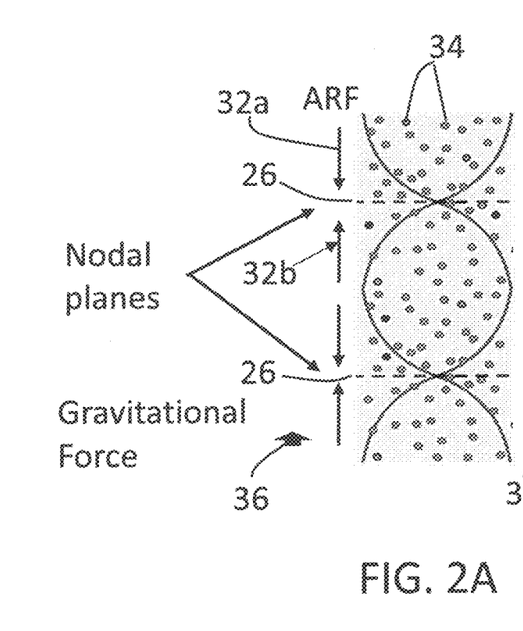
Figure 2B:
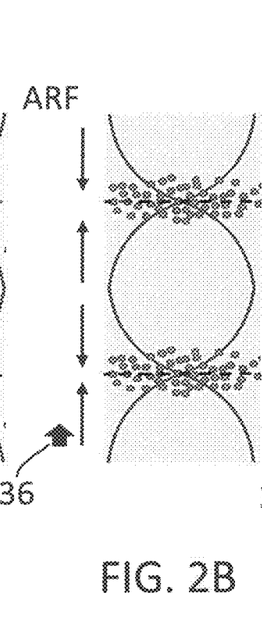
FIGS. 2B and 2C show the progression of this separation process with the buoyancy force increasing at the later stages, as the oil droplets grow in size due to agglomeration.
Figure 2C:
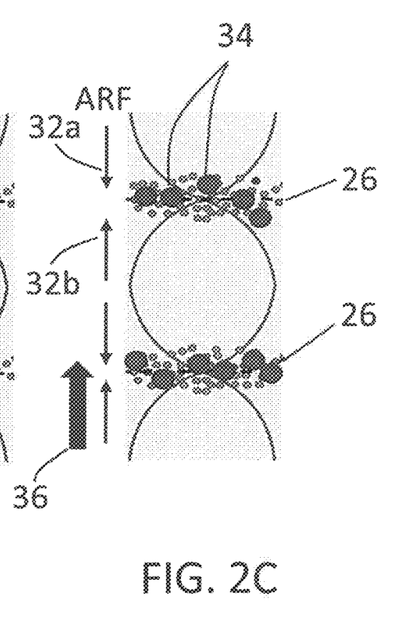

Reference will now be made in detail to the present embodiments of the invention, examples of which are illustrated in the accompanying drawings. In the Figures, similar structure will be identified using identical reference characters. It will be understood that the FIGURES are presented for the purpose of describing particular embodiments of the invention and are not intended to limit the invention thereto. Turning now to FIGS. 1A and 1B, illustrated are schematic representations of side perspective views of an embodiment of apparatus, 10, for bulk separation of oil from water. Transducer, 12, excited by waveform generator, 14, through power amplifier, 15, is disposed on the bottom of vertical cylinder, 16, containing emulsion, 18, of oil in water. The excitation frequency may range from about 200 kHz to approximately 3 MHz. The power level depends on the depth of the fluid and the geometry, but is typically between 5 W to 100 W for laboratory applications. Cylinder 16 may have a bottom surface, 20, to which transducer 12 is acoustically coupled, or a bottom surface formed by transducer 12. The cylinder may be open at top end, 22, or have a top surface, not shown. When transducer 12 is activated at a chosen frequency, a vertical sound field is generated due to reflections from top surface, 24, of the emulsion 18 of the sound waves from transducer 12, due to a large acoustic impedance mismatch between the emulsion and the material (e.g., air), or a solid, above the liquid. Small oil droplets in emulsion 18 concentrate and coalesce at horizontal standing wave nodal planes, 26, grow in size, and rise to the next upper node, the process becoming an avalanche, since the larger droplets exhibit greater buoyancy force, which enhances their gravitational separation. The directions of the forces on the oil droplets are illustrated in FIGS. 2A-2C, where FIG. 2A shows the standing wave nodal planes 26 that are parallel circular surfaces and are horizontal in orientation. Acoustic radiation forces (ARF), 32a, 32b, are directed toward these nodal planes from both sides (shown as top and bottom), and push oil droplets, 34, to the nodal planes. By contrast, gravitational buoyancy force, 36, only operates in the upward vertical direction. FIGS. 2B and 2C show the progression of this separation process with the buoyancy force increasing at the later stages, as oil droplets 34 grow in size due to coalescence.

In addition to these forces, there is also acoustic streaming possible where the sound waves from the excitation source in the liquid directs the suspension into a flow, which typically happens when the intensity of the sound exceeds a certain threshold value dependent on the fluid properties. The ARF, Gravitational, and Acoustic Streaming forces combine in a synergistic manner that results in a rapid separation of the oil, with the result that the oil droplets collect in oil layer, 28, on the surface of water, 30, as may be seen in FIG. 1B hereof. The oil separation process can take place in ~1 s, which time can be shortened by varying the frequency applied to the transducer disposed at the bottom beginning with a higher frequency (>1 MHz), and the lowering it to several 100s of kHz as the droplets form and increase in size due to coalescence. This highly dynamical process requires that the varying frequency be adjusted to the process dynamics (e.g., time scale) and the applied frequencies. The standing waves and the nodal planes remain in the fluid as an invisible scaffolding as long as the acoustic transducer is electrically driven.

The apparatus shown in FIGS. 1A and 1B can also be adapted to large separation tanks where a number of acoustic transducers can be attached near the bottom side of the tank with the number depending the size of the tank. The transducers do not need to be disposed on the bottom, but can be placed to cover a wide angle on the outer surface of a typical circular and horizontal separation tank. That is, the transducers may be placed anywhere from half the liquid height to the bottom of the tank, the purpose of doing so being to significantly speed up the separation process as compared to simple gravitational separation. Consequently, the size of the separation tank can be reduced—a major goal for oil platforms having limited available space. In summary, this approach uses acoustics to generate droplets of oil in an oil-water mixture, assist in their coalescence, after which gravitational and acoustics streaming forces may complete the final separation of the oil from water.

Although FIGS. 1A and 1B illustrate a static apparatus, an apparatus having a flowing emulsion where the oil-water mixture enters from the side near the bottom of the apparatus, and separated oil and water streams exit the apparatus at the side thereof near the top, can be designed. Such an apparatus would be similar for liquid droplets, gas bubbles, and solid particles.

Figure 3:
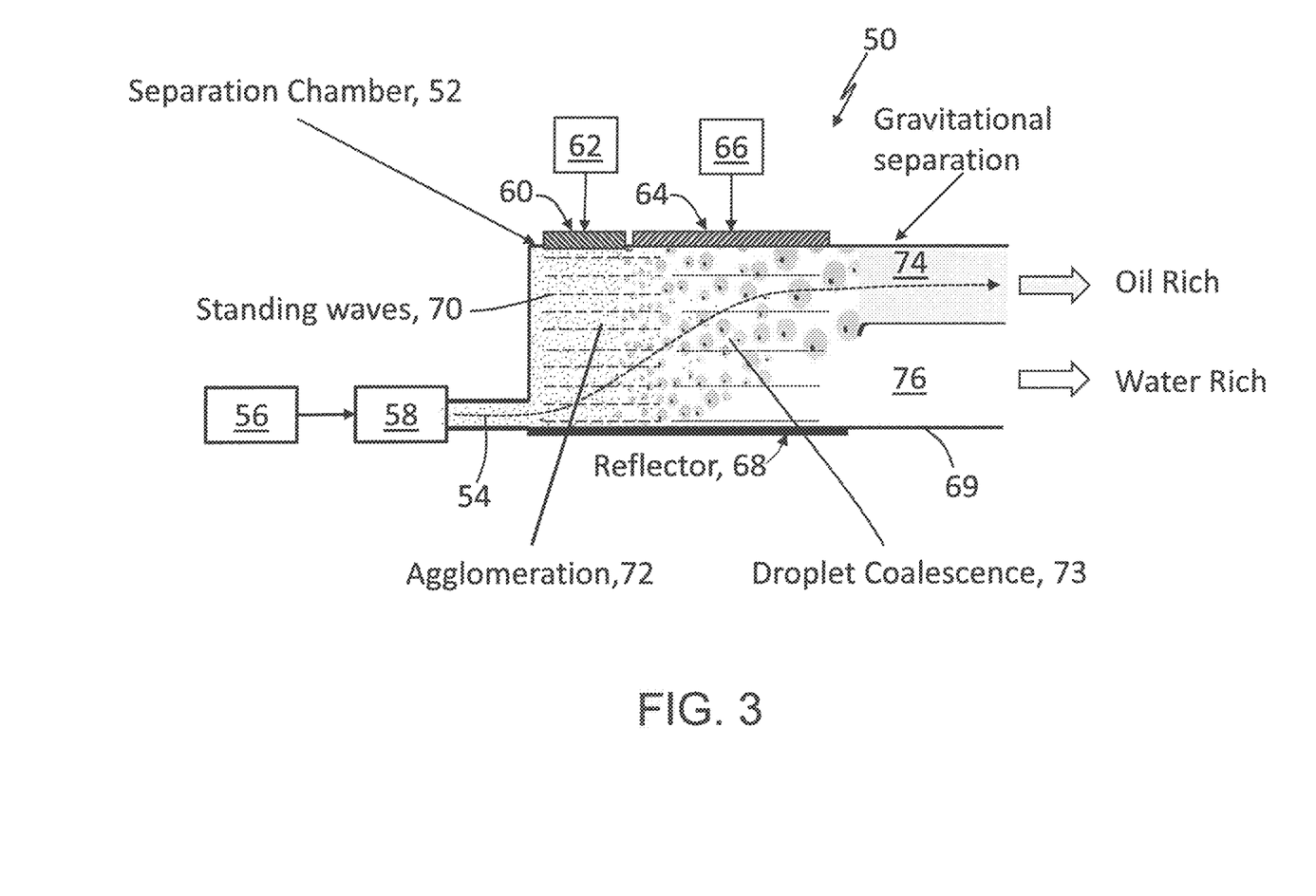
FIG. 3 is a schematic representation of a side view of continuous-flow separation system, which operates in a similar manner to that of the bulk separation system of FIGS. 1A and 1B, but can be readily scaled to large dimensions.

FIG. 3 is a schematic representation of a side view of continuous-flow separation system, 50, which operates in a similar manner to that of the bulk separation system of FIGS. 1A and 1B, but can be readily scaled to large dimensions. Separation chamber, 52, through which crude oil-water mixture, 54, is caused to flow from source, 56, by pumping system, 58, has first acoustic piezoelectric transducer, 60, driven by waveform generator, 62, and second acoustic piezoelectric transducer, 64, driven by waveform generator, 66, in acoustic contact with the outside surface thereof. Both waveform generators can generate any standard waveform (sine, square, triangle, pulsed, chirp or arbitrary shaped that are generated through any desired equation, such as sine-modulated Gaussian waves). Reflector, 68, disposed on the opposite side of separation chamber 52 from first piezoelectric transducer 60 and second piezoelectric transducer 64. Reflector 68 is not needed if chamber 52 comprises metal, since wall, 69, would be an efficient reflector.

First transducer 60 may be excited frequencies in the range between about 500 kHz and about 3 MHz, which performs the so-called preconditioning step for the oil-water mixture, where very small oil droplets (>10 μm) are caused to separate from the mixture due to the ARF, and also begin coalescing to create larger droplets. Second transducer 64 is operated at a lower frequency, typically at a frequency that is the first transducer frequency divided by an integer. Both transducers can then generate standing waves in the fluid mixture, which separate different sized droplets. That is, the lower frequency continues the coalesce process more efficiently as the droplets become larger in size and become more buoyant as the gravitational force becomes dominant. The two transducers are shown to be next to each other, but these can be slightly displaced laterally from one another without affecting the separation process. The acoustic power applied to the transducers is in the range between about 50 W and about 500 W for large tanks, but can be scaled to higher output power using liquid cooled transducers. That is, higher power can also be applied to the separation vessel, but may require that the transducers have effective heat sink capability and liquid cooling to prevent over-heating of the transducer crystals. If needed for simplification of design, the frequency of the transducer 64 may also be amplitude and frequency modulated at frequencies in the range between about 500 Hz and about 10 kHz, the range depending on the size and shape of the chamber, which may be circular instead of rectangular, as shown.

Thus, acoustic standing waves, 70, are generated by transducer 60 and reflector 68, where oil droplets can concentrate. Waveform generator 66 modulates transducer 64 such that the droplets that concentrated in the nodes and antinodes of standing waves 70 agglomerate further, 72, forming larger droplets, 73, thereby increasing their buoyancy, such that oil rich fraction, 74, is separated from water rich fraction, 76, in the flowing system, which may then be collected in separate containers.

Figures 4A, 4B, 4C:
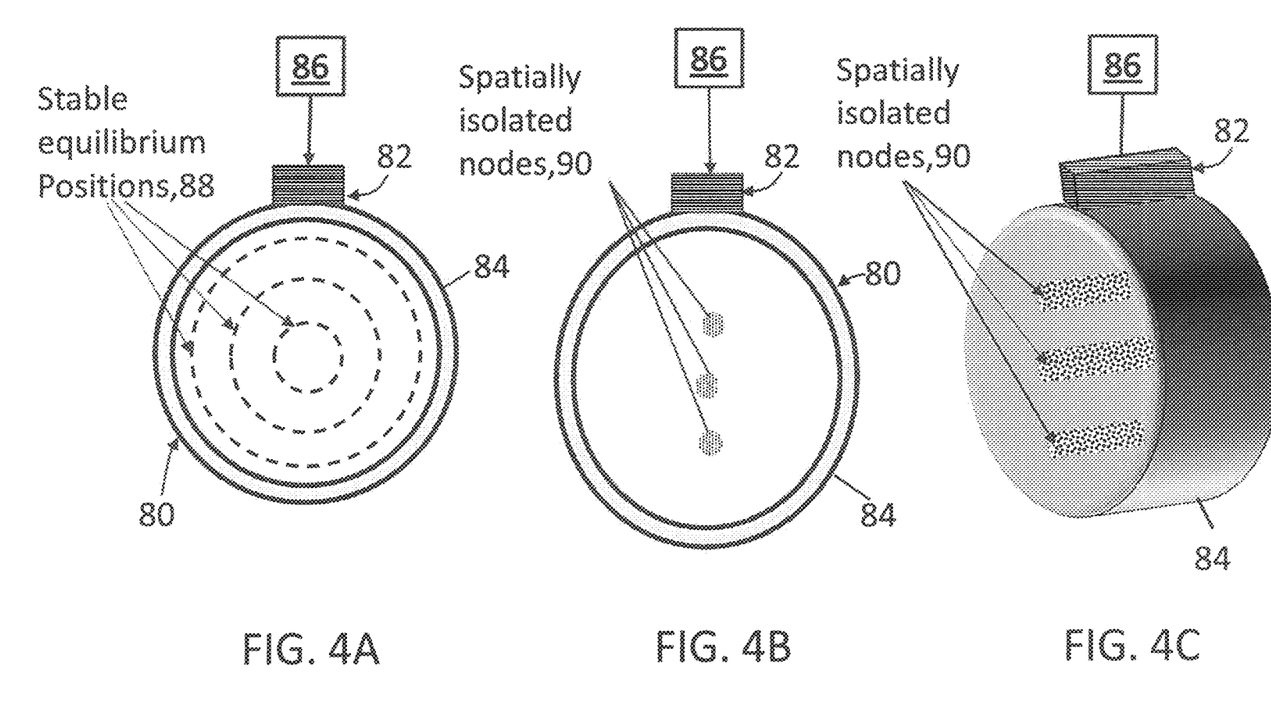
FIG. 4A is a schematic representation of the cross section of a separation chamber having a circular cross-section used as a resonator cavity where oil droplets are collected in concentric circular planes.
FIG. 4B is a schematic representation of a cross section of the resonator cavity where the symmetry of the cavity is broken by making the pipe geometry slightly elliptical such that the nodal planes collapse into lines parallel to surface of the resonator.
FIG. 4C is a schematic representation of a side perspective view of the elliptical pipe shown in FIG. 4B.

B. Lines of Oil Concentration:

FIG. 4A is a schematic representation of a cross section of separation chamber, 80, having a circular cross-section (for example, a pipe section) used as a resonator cavity, driven by transducer, 82, in acoustic contact with outer surface, 84, thereof excited by waveform generator, 86, for separating and concentrating oil droplets, which are collected in concentric circular planes, 88. Transducer 82, may be an acoustic piezoelectric transducer, and an amplifier may be used to increase the output of waveform generator 86 in some situations. FIG. 4B is a schematic representation of a cross section of resonator cavity, 80, where the symmetry of the cavity is broken by making the pipe geometry slightly elliptical. When powered by waveform generator, 86, the once circular nodal planes 88 (FIG. 4A) generated by transducer 82 collapse into lines, 90, parallel to surface, 84, of the resonator. FIG. 4C is a schematic representation of a side perspective view of the elliptical pipe shown in FIG. 4B.

There are various ways to excite the pipe other than excitation by external acoustic transducer (e.g., piezoelectric transducer) 82 attached to outside surface 84 of pipe 80, as shown in FIGS. 4A-4C. For example, Kaduchak et al. in U.S. Pat. No. 8,783,109, for "Ultrasonic analyte concentration and application in flow cytometry" introduced the concept of line driven tube where a single rectangular piece of piezoelectric crystal making a line contact with the outer surface of a capillary tube could excite the tube in a manner that particles could be concentrated at the axis of the capillary tube through which a suspension of particles is flowing. Although the present inventor has found that this works well for capillary tubes having diameters smaller than a few millimeters, for tubes having diameters >2 cm, it is also possible to excite the required higher frequency vibration modes for generating multiple concentric rings by attaching curved piezoelectric transducers on the outer surface of the pipe. The capillary tube excitation is designed to operate at the dipole mode of vibration of the tube, which will be in the audible range for a large diameter pipe (e.g., 6 in.). Therefore, the pipe should be driven at frequencies above audible range, and the present inventor has found that this can be done. Depending the acoustic field intensity required for concentration, it is possible to use partial coverage to full surface coverage of the outer surface of the pipe. Since curved transducers, even those using flat transducers having curved front portions, are more expensive, it is preferable to use multiple long (from about 0.2 times to about 1 times the outer diameter of the pipe) pieces of piezoelectric material that can easily be attached to the surface, each transducer having a small curved portion. The number of collection lines 90 depends on the applied sound frequency since not all frequencies can generate standing waves, because the wavelength of the sound must match the dimension of the resonator width (in the case of a pipe, the pipe diameter).

For a circular geometry, the ring structure shown is derived from a mathematical Bessel function. For the elliptical configuration, the frequencies do not change perceptibly. See, e.g., Sinha et al. in U.S. Pat. No. 6,644,118, for "Cylindrical acoustic levitator/concentrator having non-circular cross-section". The generated standing waves depend on the mechanical structure of the pipe and the material elastic properties. The frequency ranges involved are in the tens of kHz and the pipe itself vibrates and generates standing waves along its length. In previous configurations, the acoustic standing wave was limited to the dimension of the transducer and the fluid region between the transducer and the reflector. At lower frequencies, structural vibration removes that limitation; that is, concentric cylinders as nodal planes can be established over a long length of pipe. For example, the present inventor has found that if a pipe is excited at an arbitrary location, its effect persists to a length that is almost 20 times the pipe diameter, making it an efficient way to separate oil and water throughout a long pipe, since the entire pipe does not have to be excited if transducers are periodically disposed along the surface of the pipe. In situations, where the use of an elliptically-shaped pipe is not practical, a circular cross-section pipe will be effective although at a slightly greater length.

As stated, external excitation by transducers on the surface of a pipe (FIGS. 4A-4C) at a given location was found to be effective for producing a concentration effect extending beyond 20 tube diameters. See, e.g., Gregory Kaduchak et al. in U.S. Pat. No. 7,340,957, for "Ultrasonic analyte concentration and application in flow cytometry". Therefore, only a small number of piezoelectric sources are needed, and the pipe does not have to be driven over its entire length. Additional details may be found in Shulim Kogan, Gregory Kaduchak, and Dipen N. Sinha, "Acoustic concentration of particles in piezoelectric tubes: Theoretical modeling of cavity shape and symmetry breaking", J. Acous. Soc. Am., 116 (41), 1967-1974 (2004); and U.S. Pat. No. 6,644,118: Gregory Kaduchak and Dipen N. Sinha, for "Cylindrical acoustic levitator/concentrator having non-circular cross-section".

C. Centrifugal Force Hybrid System:

Centrifugal separators are effective for removing droplets greater than 100 μm in diameter from emulsions, and are often used as a final step in extraction of small quantities of oil remaining in the water to the minimum level after the primary separation so the water can legally be discharged into the sea. In centrifugal or cyclone separators centrifugal forces act on a droplet as it enters a cylindrical separator with a force several times greater than that for gravity. Separation of immiscible liquids, such as oil from water in a centrifugal separator can be achieved in a similar manner to the separation of solids from liquids; however, it is more difficult. Density differences for different liquids are generally smaller, and the existence of shear can cause the break-up rather than the coalescence of droplets of the dispersed phase.

When oil is produced, water, sand, drilling fluids and drill cuttings, the unintentional by-products of oil production called production waste, are also produced. Produced water is the most important of these wastes since it is produced in large quantities. For example, during the lifetime of a reservoir, on average, four barrels of water are produced for each barrel of oil. Produced water also contains materials that can harm the environment; hence discharge of such water into the ocean after bringing it to the surface is the subject of stricter regulations, even though the separated produced water can be used for water injection.

There is a need for subsea separation since by separating the water and oil before sending them to the surface for various reasons. A similar situation exists for offshore oil platforms as well. For example, there is a cost for bringing the oil-water mixture to the surface and then separating the oil from the water, since the water then needs to be disposed of after removal of pollutants. Therefore, due to their economic and environmental advantages, subsea separators constitute important components for any subsea installation. Current gravitational or centrifugal separation for both subsea and offshore platform operations often require chemical treatment using demulsifiers that inhibit emulsion formation to prevent foaming that makes it harder to separate oil from water. To reduce cost and make the separation process more efficient, it is important to find ways to separate oil and water without resorting to such chemical treatment.

Cyclone separators rely on a single mechanism, the centrifugal force that depends on density difference, droplet volume, and velocity. For many types of oil, such as heavy oil, the density difference between oil and water is small. Therefore, unless the droplet volume is large enough and the velocity is high, the separation force is not high. By contrast, the ARF depends on density difference, compressibility difference, droplet volume, and acoustic frequency, such that, even when the density difference is minimal and the droplet size is small, there is sufficient force to separate oil from water. Thus, ARF can be effective as a seeding process where oil is initially separated from water on a microscopic level, and begins to coalesce thereby forming larger droplets where centrifugal forces can become the dominant separating mechanism. Such a hybrid separation system can be made more compact and more efficient than a centrifugal separation system alone.

Figure 5:
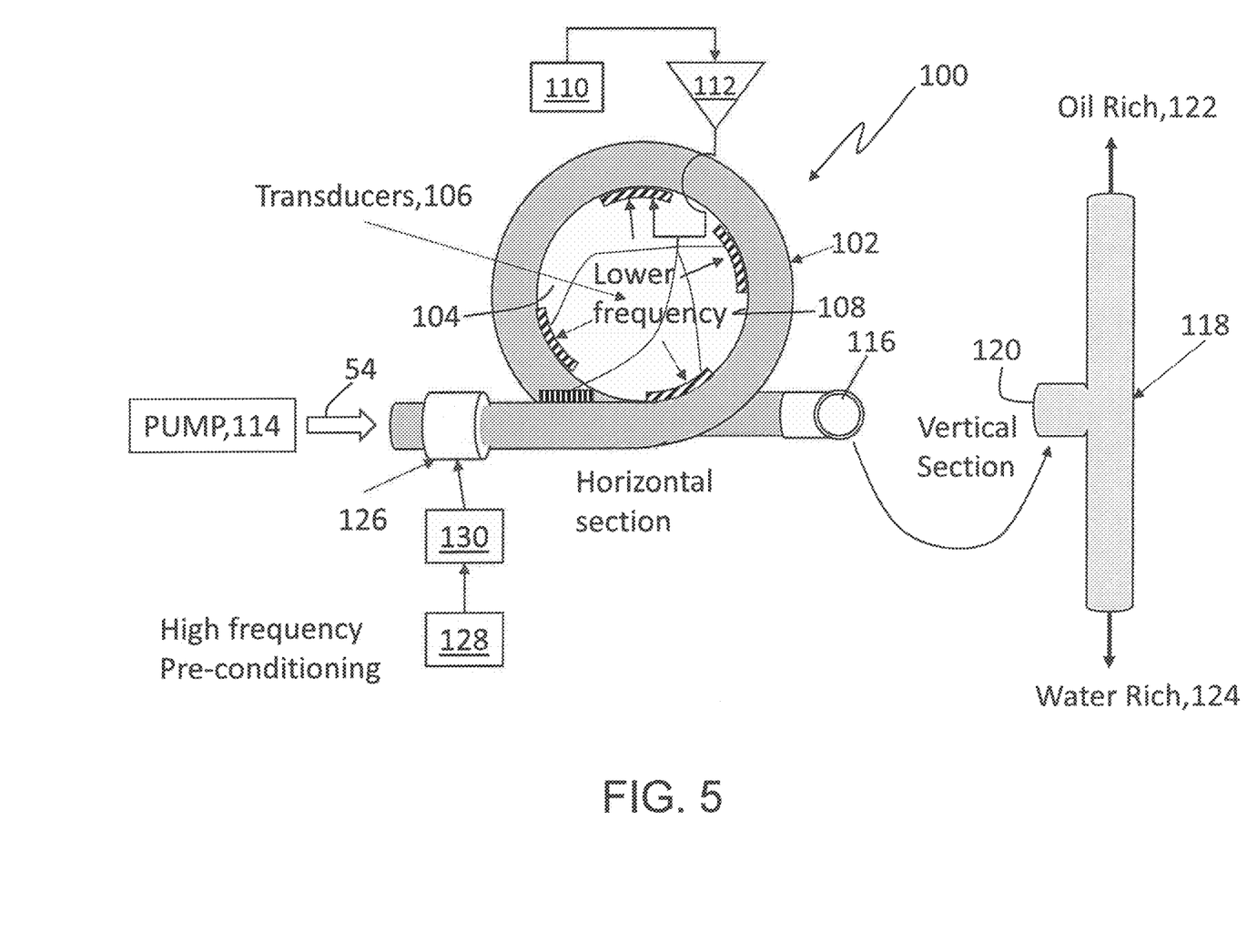
FIG. 5 is a schematic representation of a top perspective view of an embodiment of the hybrid acoustic/centrifugal separation system of the present invention.

Turning to FIG. 5, a schematic representation of a top perspective view of an embodiment of hybrid acoustic/centrifugal separation system, 100, of the present invention is shown. A section of hollow pipe, 102, formed into circular shape, 104, disposed in the horizontal direction, and having transducers, 106, attached to surface, 108, thereof, at chosen regular intervals. Transducers 106, which may be acoustic piezoelectric transducers, are excited using waveform generator, 110, through amplifier, 112, are illustrated as spaced apart and attached to the inside surface of curved pipe, 102, but can be disposed on the outer side as well. Oil-water mixture or emulsion 54 is flowed through pipe 102, using pump, 114, and out through exit port, 116, which is in fluid communication with vertical pipe, 118, through horizontal inlet, 120. In some seabed applications, pump 114 will be unnecessary as the oil/water mixture will be under substantial pressure. Pipe 118 has a chosen length, not shown to scale, and upper oil-rich fluid exit, 122, and lower water-rich exit, 124, at opposite ends thereof. The chosen length will depend on the diameter of pipe 102, and exit locations 122 and 124 need not be close to the separator. The acoustic and centrifugal forces separate the oil micro-droplets from the mixed fluid and vertical stage 118 physically preferentially channels the separated fluids in two separate exits; since oil is less dense than water, the separated oil goes to the upper exit location. Once separated, the oil and water streams can be directed to a storage tank for the oil, and a water disposal unit for the water, as examples. High-frequency transducer, 126, excited using waveform generator, 128, through amplifier, 130, preconditions oil-water emulsion 54, as it enters pipe 102, as described above, forming spatially-isolated nodes parallel to the direction of flow as illustrated in FIG. 3 hereof. Centrifugal forces then move the agglomerated droplets in a direction orthogonal to the flow for achieving the separation process.

Although it is expected that a circular cross-section for pipe 102 will be effective for separation of oil from water, for maximum efficiency, pipe 102 needs to be oblate (e.g., elliptical) in cross-section. As illustrated in FIGS. 4B and 4C, transducers 82 can be disposed in acoustic contact with outside surface 84 of the elliptical pipe, and spaced apart along the pipe as needed. The long axis of the ellipse should be generally perpendicular to the radius of the circular loop shown in FIG. 5. To further illustrate this geometry, if, in an extreme case, a flat pipe is formed into a loop with the width thereof being perpendicular to the radial plane. It is easier to bend a slightly elliptical pipe in that direction. The slight variation in geometry for the helix illustrated in FIG. 7 does not present and important change. Typically, a highly elliptical pipe is not required. For example, the ratio of minor to major axis ratio of the ellipse can range between about 0.8 to about 0.99, and localized concentration of particles (droplets) still occurs. See, e.g., FIG. 9A of U.S. Pat. No. 6,644,118, supra. It should be mentioned that although the '118 patent discusses elliptical piezoelectric cylinders for the flowing fluids, the present inventor has found that an elliptical pipe having transducers in acoustic contact with its outer surface will generate the same acoustic force patterns. It should also be mentioned that pipe 102 does not have to be exactly circular in its curvature, but simply curved in order to generate the required centrifugal forces.

Figure 6A:
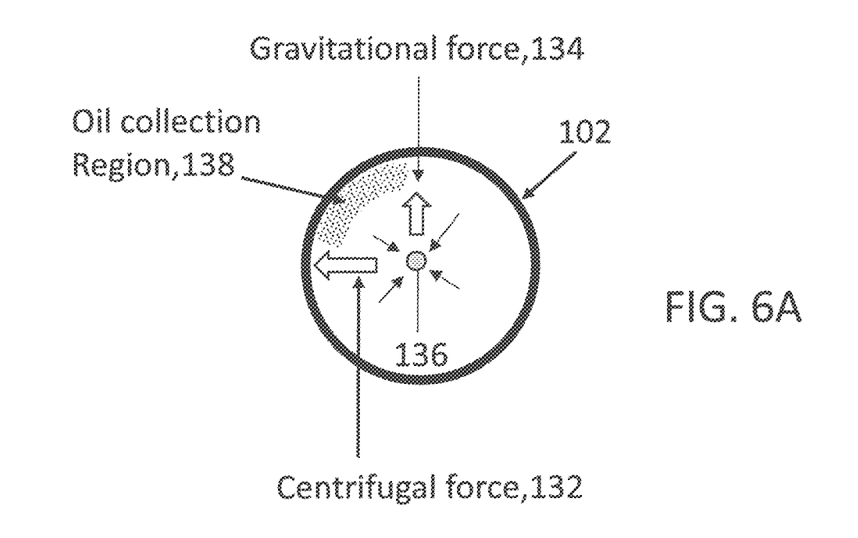
Figure 6B:
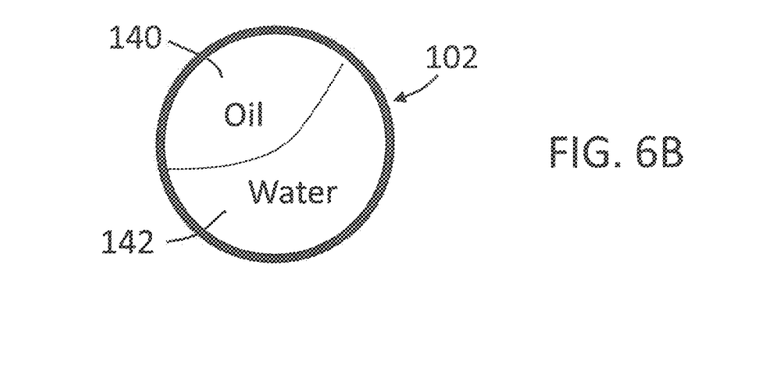
FIG. 6B shows a complete separation of oil and water.

FIGS. 6A and 6B are schematic representations of a cross-section of pipe 102 and show the major forces acting on an oil droplet in water inside the circular pipe section. The forces at work include: (1) the Centrifugal force, 132, which depends on the density difference, the droplet volume, and the flow velocity; (2) the Gravitational force, 134, which depends on the density difference; and (3) the Acoustic force. Acoustic forces encourage the small droplets to cluster together and coalesce. Viscous drag forces oppose any movement of droplets, but are not shown in FIG. 6A, since the principal forces dominate at the later stage. Gravitational force 134 gives rise to the buoyancy force that becomes prominent as droplets, 136, coalesce and grow in size. The magnitude of the centrifugal force depends on the droplet size in addition to the fluid flow rate, and pipe curvature. These forces act to move oil, 138, to one side of the pipe following a chosen length of the pipe as illustrated in FIGS. 6A and 6B. General oil collection region 138 is shown in FIG. 6A, whereas FIG. 6B illustrates a complete separation of oil, 140, and water, 142. In practice, it is not necessary to completely separate the two phases (oil and water) and, typically, large blobs and droplets of oil are pushed to one side. That separation is sufficient for the final separation of the oil and water in vertical separator stage 118, which permits the separator to be more compact.

At higher temperatures, the density difference becomes greater, and hence the force on the droplets increases. Additionally, higher temperatures generate lower viscosity, which assists separated droplets in moving to one side of the pipe.

Figure 7:
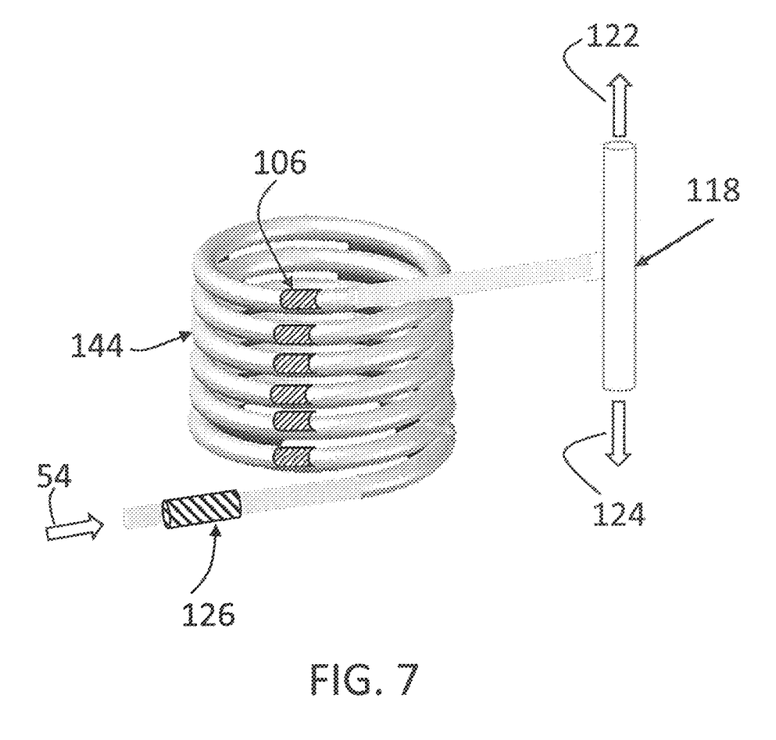
FIG. 7 is a schematic representation of a side perspective view of multiple stacked separation units operating as a continuous pipe formed into a spiral or helical configuration, which provides additional separation of the oil from water in a compact configuration.

FIG. 7 is a schematic representation of a side perspective view of multiple stacked separation units 102 shown in FIG. 5 hereof, operating as continuous pipe, 144, and formed into a spiral or helical configuration having increased length. This configuration provides additional separation of the oil from water in a compact configuration. Clearly, other configurations can be envisioned.

A single oil droplet of diameter, $D_o$ and density, $\rho_o$ moving tangentially in a host medium of water in a pipe of radius of curvature, R will experience the centrifugal force $F_c$:

$$F_c = (\rho_w - \rho_0)\frac{V^2}{R}\frac{\pi D_O^3}{6}, \qquad \text{Eq. (3)}$$

The presence of vortices, nucleation centers, and small bubbles further enhance separation. In subsea operation, the pressure can be high and, consequently, the oil-water mixture is in the form of an emulsion having very small droplet size. Acoustic separation and droplet coalescence to create larger drops that significantly assists the centrifugal separation as larger droplets experience a stronger separation force as can be seen from Eq. 3.

An advantage that acoustic separation has over centrifugal separation may be observed from Eqs. 2 and 3. If the densities of oil and water are the same, there is still a strong force acting on the droplets, because the compressibilities are typically quite different. The acoustic force depends on both density and compressibility besides droplet size and other factors, whereas for centrifugal force, it vanishes if the oil and water densities are the same, although there can be some second order effects that come into play. Therefore, commencing the separation process acoustically, thereby creating larger droplets, followed by the centrifugal force makes more sense instead of using only the centrifugal force as is done in hydrocyclones.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for separating oil droplets from water in a mixture thereof, comprising:
   flowing said mixture through a first length of pipe having a first exit orifice;
   generating first acoustic standing waves inside of the first length of pipe effective for producing acoustic radiation forces having first pressure nodes such that said oil droplets concentrate and coalesce at the first pressure nodes, and wherein the acoustic waves have a first frequency;
   flowing the mixture having the concentrated and coalesced oil droplets passing through the first exit orifice through a second length of pipe having a second exit orifice, the second length of pipe being formed into a planar configuration having a radius of curvature and an axis, such that the coalesced oil droplets move to greater distances from the axis as a result of centrifugal forces; and
   separating the coalesced oil droplets from the water passing through the second exit orifice.

2. The method of claim 1, wherein said step of separating the coalesced oil droplets from the water, comprises flowing the mixture having concentrated and coalesced oil droplets passing through the exit of the second pipe length through a third length of pipe disposed vertically and having an upper exit orifice and a lower exit orifice, whereby the concentrated and coalesced oil droplets separate from the water as a result of the buoyancy of the coalesced oil droplets and pass through the upper exit orifice, and the water passes through the lower exit orifice thereof.

3. The method of claim 1, further comprising the steps of:
   flowing the mixture having concentrated and coalesced oil droplets passing through the first exit orifice through a fourth length of pipe having a fourth exit orifice after said step of generating first acoustic standing waves inside of the first length of pipe having a first frequency, and before said step of flowing the mixture having the concentrated and coalesced oil droplets through a second length of pipe; and generating second acoustic standing waves inside of the fourth length of pipe effective for producing acoustic radiation forces having second pressure nodes such that said oil droplets concentrate and coalesce at the second pressure nodes, and wherein the second acoustic waves have a second frequency.

4. The method of claim 3, wherein the first frequency and the second frequency are between 500 kHz and 3 MHz.

5. The method of claim 3, wherein the first frequency is greater than the second frequency.

6. The method of claim 3, wherein the first length of pipe and the fourth length of pipe are oblate in cross section.

7. The method of claim 1, wherein the second length of pipe is formed into a helical configuration having a radius of curvature and an axis, wherein the axis is vertical.

8. A method for separating oil droplets from water in a mixture thereof, comprising:

flowing said mixture through a first length of pipe having a first exit;

generating first acoustic standing waves inside of the first length of pipe effective for producing acoustic radiation forces having first pressure nodes such that said oil droplets concentrate and coalesce at the first pressure nodes, and wherein the acoustic waves have a first frequency;

flowing the mixture having concentrated and coalesced oil droplets passing through the first exit through a second length of pipe having a second diameter and a second exit, the second length of pipe being formed into a planar circular configuration having a radius of curvature and an axis, such that the coalesced oil droplets move to greater distances from the axis as a result of centrifugal forces; and flowing the mixture having concentrated and coalesced oil droplets passing through the second exit orifice through a third length of pipe disposed vertically and having an upper exit orifice and a lower exit orifice, whereby the concentrated and coalesced oil droplets separate from the water as a result of the buoyancy of the coalesced oil droplets and pass through the upper exit orifice of the third length of pipe, and the water passes through the lower exit orifice thereof.

9. The method of claim 8, further comprising the steps of:

flowing the mixture having concentrated and coalesced oil droplets through a fourth length of pipe after said step of generating first acoustic standing waves inside of the first length of pipe having a first frequency, and before said step of flowing the mixture having the concentrated and coalesced oil droplets through a second length of pipe; and generating second acoustic standing waves inside of the fourth length of pipe effective for producing acoustic radiation forces having second pressure nodes such that said oil droplets concentrate and coalesce at the second pressure nodes, and wherein the second acoustic waves have a second frequency.

10. The method of claim 9, wherein the first length of pipe and the fourth length of pipe are oblate in cross section.

11. The method of claim 8, wherein the first frequency and the second frequency are between 500 kHz and 3 MHz.

12. The method of claim 11, wherein the first frequency is greater than the second frequency.

13. The method of claim 8, wherein the second length of pipe is formed into a helical configuration having a radius of curvature and an axis, wherein the axis is vertical.

14. An apparatus for separating oil droplets from water in a mixture thereof, comprising:

a first length of pipe through which said mixture is caused to flow, said first length of pipe having an outer surface, an inner volume, and a first exit orifice;

at least one first acoustic transducer in acoustic contact with the outer surface of said first length of pipe, for generating first acoustic standing waves in the inner volume of said first length of pipe effective for producing acoustic radiation forces having first pressure nodes such that said oil droplets concentrate and coalesce at the first pressure nodes, and wherein the acoustic waves have a first frequency;

a first waveform generator for powering said at least one first acoustic transducer; and a second length of pipe for receiving the concentrated and coalesced oil droplets flowing through the first exit orifice of said first length of pipe, having a second exit orifice, said second length of pipe being formed into a planar configuration having a radius of curvature and an axis, such that the coalesced oil droplets move to greater distances from the axis as a result of centrifugal forces.

15. The apparatus of claim 14, further comprising a third length of pipe for receiving the concentrated and coalesced oil droplets flowing through the second exit orifice, disposed vertically and having an upper exit orifice and a lower exit orifice, whereby the concentrated and coalesced oil droplets separate from the water as a result of the buoyancy of the coalesced oil droplets and pass through the upper exit orifice of said third length of pipe, and the water passes through the lower exit orifice thereof.

16. The apparatus of claim 14, further comprising:

a fourth length of pipe having an outer surface and an inner volume for receiving the mixture having concentrated and coalesced oil droplets flowing through the first exit orifice; and at least one second acoustic transducer in acoustic contact with the outer surface of said fourth length of pipe, for generating second acoustic standing waves in the inner volume of said fourth length of pipe effective for producing acoustic radiation forces having second pressure nodes such that said oil droplets concentrate and coalesce at the second pressure nodes, and wherein the acoustic waves have a second frequency.

17. The apparatus of claim 16, wherein the first frequency and the second frequency are between 500 kHz and 3 MHz.

18. The apparatus of claim 17, wherein the first frequency is greater than the second frequency.

19. The apparatus of claim 16, wherein said at least one first acoustic transducer and said at least one second acoustic transducer comprise piezoelectric transducers.

20. The apparatus of claim 16, wherein said first length of pipe and said fourth length of pipe are oblate in cross section.

21. The apparatus of claim 14, wherein said second length of pipe is formed into a helical configuration having a radius of curvature and an axis, wherein the axis is vertical.

22. An apparatus for separating oil droplets from water in a mixture thereof, comprising:

a first length of pipe through which said mixture is caused to flow, said first length of pipe having an outer surface, an inner volume, and a first exit orifice;

at least one first acoustic transducer in acoustic contact with the outer surface of said first length of pipe, for generating first acoustic standing waves in the inner volume of said first length of pipe effective for producing acoustic radiation forces having first pressure nodes such that said oil droplets concentrate and coalesce at the first pressure nodes, and wherein the acoustic waves have a first frequency;

a first waveform generator for powering said at least one first acoustic transducer;

a second length of pipe for receiving the concentrated and coalesced oil droplets flowing through the first exit orifice of said first length of pipe, having a second exit orifice, said second length of pipe being formed into a planar configuration having a radius of curvature and an axis, such that the coalesced oil droplets move to greater distances from the axis as a result of centrifugal forces; and a third length of pipe for receiving the concentrated and coalesced oil droplets flowing through the second exit orifice, disposed vertically and having an upper exit orifice and a lower exit orifice, whereby the concentrated and coalesced oil droplets separate from the water as a result of the buoyancy of the coalesced oil droplets and pass through the upper exit orifice of said third length of pipe, and the water passes through the lower exit orifice thereof.

23. The apparatus of claim 22, further comprising:

a fourth length of pipe having an outer surface and an inner volume, for receiving the mixture having concentrated and coalesced oil droplets flowing through the first exit orifice; and at least one second acoustic transducer in acoustic contact with the outer surface of said fourth length of pipe, for generating second acoustic standing waves in the inner volume of said fourth length of pipe effective for producing acoustic radiation forces having second pressure nodes such that said oil droplets concentrate and coalesce at the second pressure nodes, and wherein the acoustic waves have a second frequency.

24. The apparatus of claim 23, wherein the first frequency and the second frequency are between 500 kHz and 3 MHz.

25. The apparatus of claim 24, wherein the first frequency is greater than the second frequency.

26. The apparatus of claim 23, wherein said at least one first acoustic transducer and said at least one second acoustic transducer comprise piezoelectric transducers.

27. The apparatus of claim 23, wherein said first length of pipe and said fourth length of pipe are oblate in cross section.

28. The apparatus of claim 22, wherein said second length of pipe is formed into a helical configuration having a radius of curvature and an axis, wherein the axis is vertical.

* * * * *